United States Patent
Walfish

(10) Patent No.: US 9,826,018 B1
(45) Date of Patent: Nov. 21, 2017

(54) FACILITATING SECURE WEB BROWSING ON UNTRUSTED NETWORKS

(71) Applicant: GOOGLE INC., Mountain View, CA (US)

(72) Inventor: Sheldon Israel Walfish, Palo Alto, CA (US)

(73) Assignee: GOOGLE INC., Mounatin View, CA (US)

( * ) Notice: Subject to any disclaimer, the term of this patent is extended or adjusted under 35 U.S.C. 154(b) by 636 days.

(21) Appl. No.: 13/844,198

(22) Filed: Mar. 15, 2013

(51) Int. Cl.
 *H04L 29/08* (2006.01)
 *H04L 29/06* (2006.01)

(52) U.S. Cl.
 CPC .............. *H04L 67/02* (2013.01); *H04L 63/08* (2013.01); *H04L 63/168* (2013.01)

(58) Field of Classification Search
 CPC ....... H04L 67/02; H04L 63/08; H04L 63/168; H04L 67/14; G06F 17/30861
 See application file for complete search history.

(56) References Cited

U.S. PATENT DOCUMENTS

| | | | | |
|---|---|---|---|---|
| 7,093,279 B2 * | 8/2006 | Tretheway | ............ | H04L 63/083 709/229 |
| 8,200,833 B1 * | 6/2012 | Lau | ....................... | H04L 63/105 709/227 |
| 8,250,653 B2 * | 8/2012 | Wang | ....................... | G06F 9/468 713/164 |
| 8,566,452 B1 * | 10/2013 | Goodwin, III | ...... | H04L 63/0281 709/227 |
| 8,701,165 B2 * | 4/2014 | Krivosheev | ......... | G06F 21/6263 726/23 |
| 9,137,319 B2 * | 9/2015 | Xu | ....................... | G06F 21/6263 726/25 |
| 2002/0042830 A1 * | 4/2002 | Bose | ....................... | H04L 29/06 709/230 |
| 2005/0021668 A1 * | 1/2005 | Beesley | .............. | H04L 63/1416 709/217 |
| 2007/0240223 A1 * | 10/2007 | Zpevak | ................. | G06F 21/577 726/25 |
| 2007/0240225 A1 * | 10/2007 | Shrader | ................. | G06F 21/552 726/25 |
| 2008/0077788 A1 * | 3/2008 | Jain | ....................... | H04L 63/029 713/151 |
| 2012/0102553 A1 * | 4/2012 | Hsueh | ................... | H04L 9/3234 726/6 |
| 2013/0347073 A1 * | 12/2013 | Bryksa | .................. | H04L 63/105 726/4 |
| 2015/0012987 A1 * | 1/2015 | Tian | .................... | H04L 63/0815 726/6 |

\* cited by examiner

Primary Examiner — Thomas Dailey
Assistant Examiner — Ruth Solomon
(74) Attorney, Agent, or Firm — Procopio, Cory, Hargreaves & Savitch LLP

(57) ABSTRACT

Systems and methods described herein are directed to a browser mode that provides a secure type of browsing window or a public type of browsing window. Within the secure type of browsing window, systems and methods may enforce all connections as being over Hypertext Transfer Protocol Secure (HTTPS). Within the public type of browsing window, connections that require login, text entry, or HTTPS are prevented since session cookies and browsing activity from the public type of window may be eavesdropped by a third party. The browser provides separate cookie jars (which store the browser cookies) for the secure type window and the public type window.

21 Claims, 11 Drawing Sheets

FACILITATING SECURE WEB BROWSING ON UNTRUSTED NETWORKS

BACKGROUND

Background Information

The subject matter described herein relates generally to internet browsing and, more particularly, to secure mode browsing.

Related Technology

Open wireless networks may be provided by businesses to provide an internet connection to customers. A user may utilize a personal device, (e.g. a laptop, a mobile phone, a tablet, etc.) to connect to a wireless network and browse the internet. Such open wireless networks may be left unencrypted or unsecured so that any user within proximity of the open wireless network may connect and utilize the internet without requiring special login credentials.

A problem with open wireless access points is that they are not encrypted, thereby making it possible for a malicious third party to hijack connections going to the access point to read and modify all the network traffic. Websites accessed via Hypertext Transfer Protocol (HTTP) send plain unencrypted network traffic to the user. A user browsing on an unencrypted or unsecured open wireless network runs the risk of having one's connection and activities over the internet eavesdropped or hijacked by a malicious third party. For example, browsing on untrusted or unencrypted open wireless networks may expose session cookies or data packets to sniffing, or having the session cookies or data packets eavesdropped by a third party. A user submitting login credentials for accessing personal information (e.g. e-mail, bank account information, online auctions, etc.), may have their credentials potentially stolen, or may have their activities monitored by the malicious third party. The malicious third party may even inject malicious content into the user's device as a user connects to the internet.

For example, there are programs directed to aiding hackers on open wireless networks to steal cookies that are visible on Hypertext Transfer Protocol (HTTP) connections. Stealing the cookies may allow a hacker to steal a user's logged in session for the website corresponding to the cookie. Such programs could thus be used to compromise social network accounts of users who were logged into the social network while connected on an open wireless access point.

Websites accessed via Hypertext Transfer Protocol Secure (HTTPS) utilize HTTP+SSL (Secure Socket Layer) cryptographic protection, which ensures that a malicious third party cannot see the traffic or modify it. Login pages may require a login and password to be sent over HTTPS to protect the credentials from being stolen. However, the login page may subsequently convert the login information to a session cookie that gets set on the user's browser, which may get sent as plain unencrypted traffic when HTTP connections are in use. Because the session cookie grants access to the user's account, having the session cookie transmitted as plain unencrypted traffic runs the risk of having the information eavesdropped by a malicious third party.

Users browsing on an open wireless access point may utilize a Virtual Private Network (VPN). The VPN sends all network traffic (including web traffic) over an encrypted "tunnel", preventing the traffic from being seen or modified by a malicious third party at the wireless access point. However, the user must completely trust the entity (e.g. a company, the administrator of a private server, etc.) that provides the VPN tunnel service. Furthermore, not everyone has a corporate VPN or is willing to pay to access one. Additionally, once the network traffic exits the VPN tunnel (e.g. at the company's VPN servers) the traffic is still subject to attack by any of the network points it travels through.

Users still want to be able to utilize these wireless access points securely, without worrying about having their privacy violated by a malicious third party. A solution without the above limitations is needed.

SUMMARY

Aspects of the example implementations include a computer-implemented method, which involves establishing a type of a browser mode. When the type of the browser mode is secure, a secure type of browser window is established that manages or facilitates Hypertext Transfer Protocol Secure (HTTPS) connections and rejects a HTTP connection, and a public type of browser window is established that rejects HTTPS connections and manages or facilitates Hypertext Transfer Protocol (HTTP) connections. According to an example implementation, when the type of browser window is public, text entry and logins may be blocked in the browser window.

Additional aspects of the example implementations include a non-transitory computer readable medium having stored therein a program for making a computer execute a method for establishing a connection. The program includes computer executable instructions for performing steps, including establishing a type of a browser mode. When the type of the browser mode is secure, a secure type of browser window is established that manages or facilitates Hypertext Transfer Protocol Secure (HTTPS) connections and rejects a HTTP connection, and a public type of browser window is established that rejects HTTPS connections and manages or facilitates Hypertext Transfer Protocol (HTTP) connections. According to an example implementation, when the type of browser window is public, text entry and logins may be blocked in the browser window.

Additional aspects of the example implementations include an apparatus with a processor. The apparatus is configured to perform functions of a browser window generator that generates a type of a browser window; and an establishing unit that, when the type of the browser window is secure, establishes at least one connection through the browser window as an Hypertext Transfer Protocol Secure (HTTPS) connection and rejects a HTTP connection, and when the type of the browser window is public, rejects any of the at least one connection that is the HTTPS connection and establishes any one of the at least one connection that is a Hypertext Transfer Protocol (HTTP) connection. According to an example implementation, when the type of browser window is public, text entry and logins may be blocked in the browser window.

DETAILED DESCRIPTION

The subject matter described herein is taught by way of example implementations, in which various details have been omitted to avoid obscuring the subject matter. Example implementations described herein are directed to structures and functions for implementing secure mode browsing.

Example implementations include "Secure" type windows and "Public" type windows. These types of windows may be marked with visible distinctions. (e.g., green border for secure windows vs. red border for public, or closed lock icon vs. open lock icon, etc.), but is not limited to any particular distinction.

In an example implementation a user may select the type of browsing window to be used for establishing outgoing connections, and have the corresponding type of browser window generated in response to the selection. The selection can be made by providing a prompt, or by other methods known to one skilled in the art. The user can then open a secure browser window to ensure that outgoing connections are secure. However, if the user does not require the browsing traffic to be secure, or has concerns that certain destinations may not render an HTTP connection correctly, then the user can open a public browser instead. The user may also toggle between secure and public mode within the browsing window as desired.

In an example implementation, a secure browser mode may be set by default or an inquiry for setting a browser to the secure browser mode may be provided. The default can be set by the user or can be set by a browser window generator based on, for example, environment conditions. For example, a browsing window generator may detect that the user is presently connected to an unencrypted or open wireless network operate in the secure browser mode by default, or provide a notification that prompts the user as to whether secure browsing mode should be activated. When the secure browser mode is activated, the browser may restart, wherein separate cookie jars for secured windows and public windows may be utilized. In another example implementation, the browser is not restarted, but rather each page is refreshed with new cookie jars separated for the secure windows and the public windows.

Figure 1:
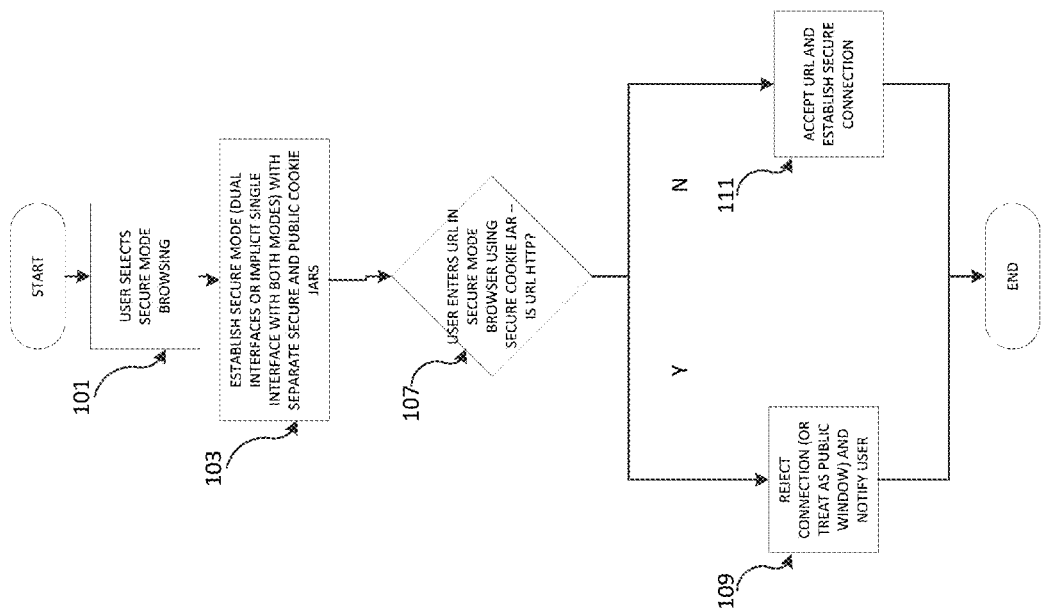
FIG. 1 illustrates a flowchart for generating a browser window and establishing a connection in accordance with an example implementation.
Figure 4:
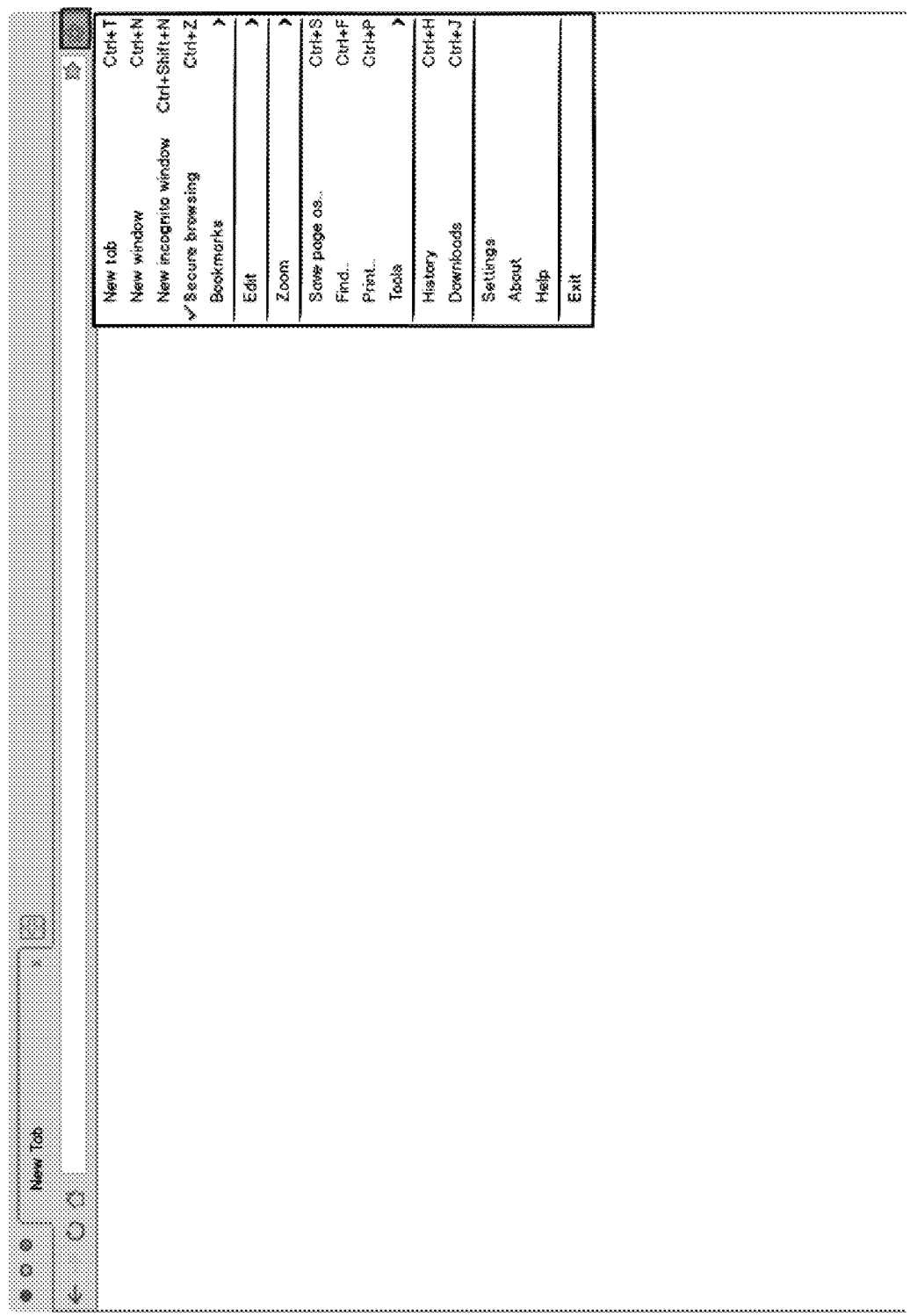
FIGS. 4-10 illustrate various example user interfaces for implementing operations of the foregoing example implementations.
Figure 8:
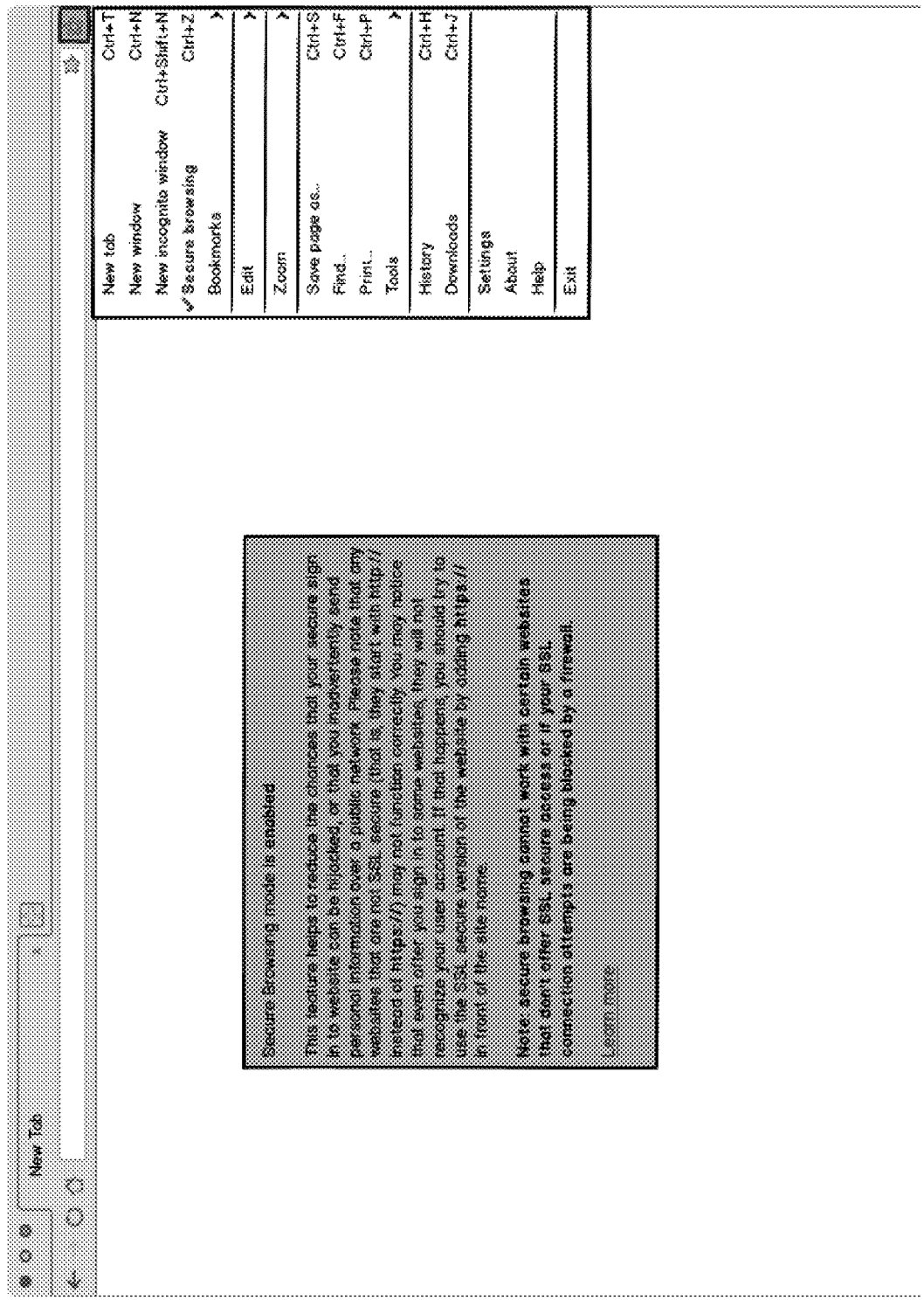
Figure 9:
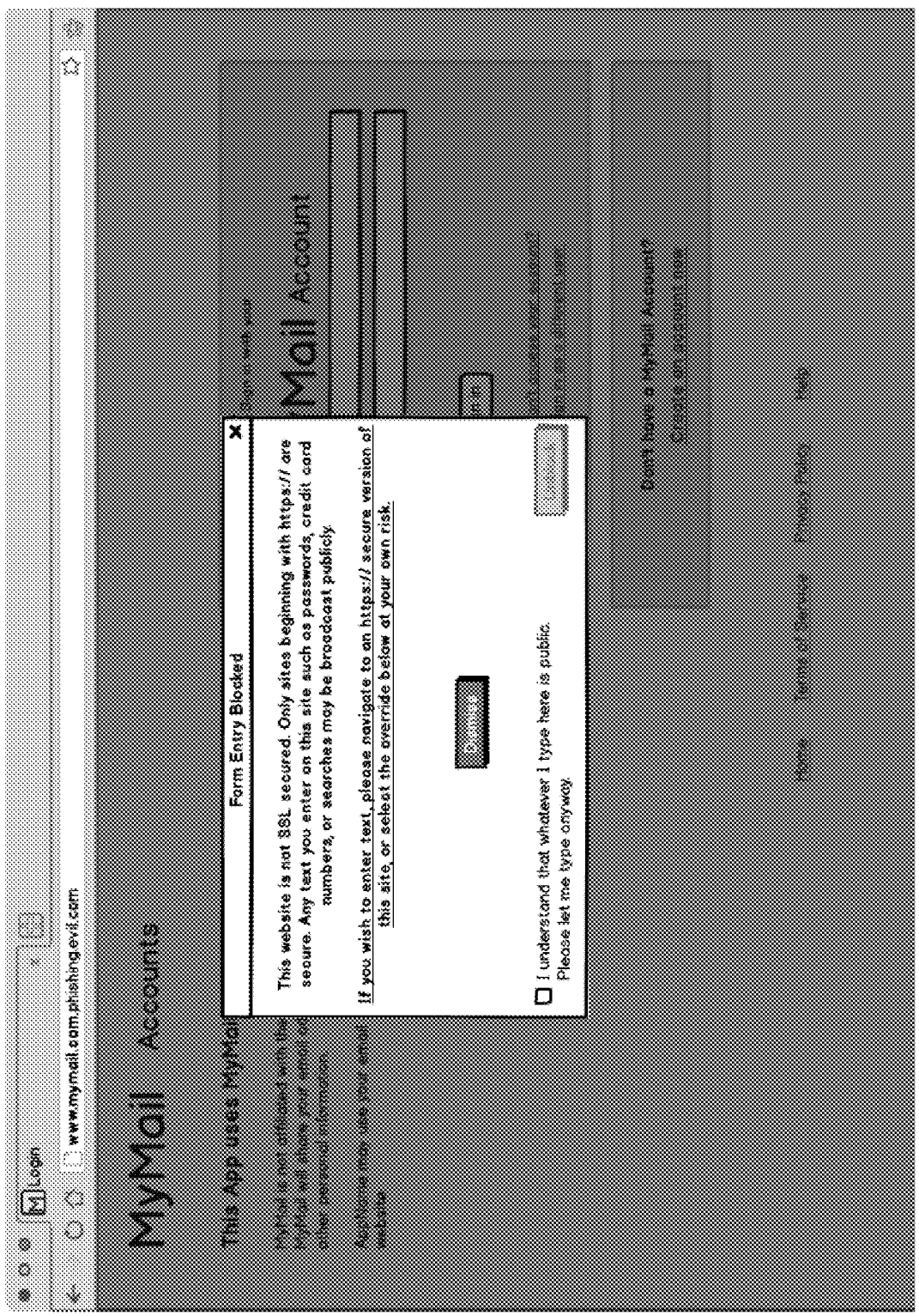
Figure 10:
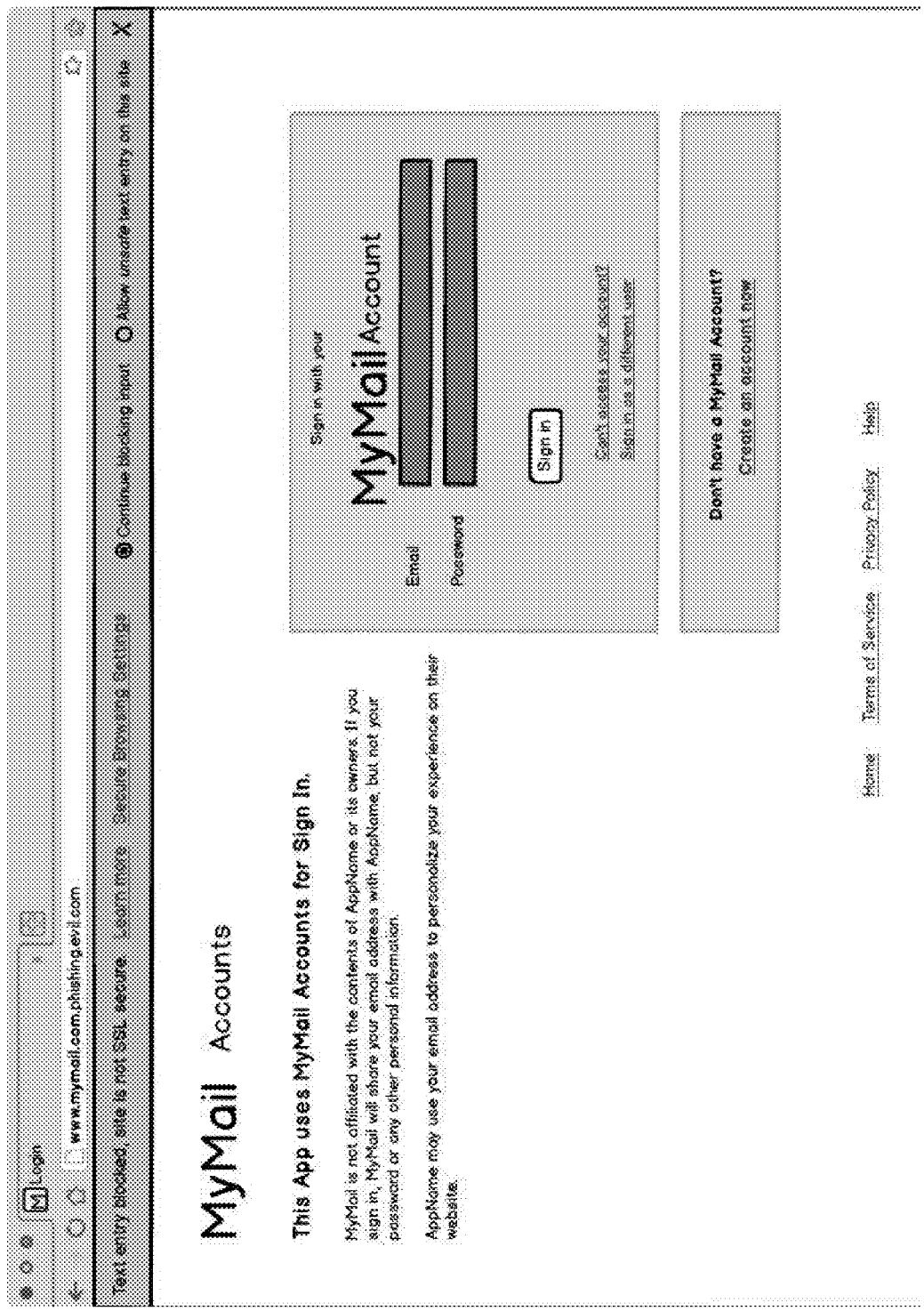

FIG. 1 illustrates a flowchart for generating a browser window and establishing a connection in accordance with an example implementation. At 101, a user may open a browser, and select secure mode browsing. For example, but not by way of limitation, the selection operation 101 may appear as shown in FIG. 4. The generating and establishing the type of window may be conducted automatically by a browser window generator unit, or can be set by the user. At 103, a secure mode interface and separate cookie jars are established at the browser. In one example implementation, the secure mode interface may include dual secure and public interfaces, as discussed below with respect to FIGS. 5 and 6. In another example implementation, the secure mode interface implicitly determines the cookie jar and whether text input should be restricted to the window, based on whether the URL for which access is requested is a secure HTTPS website, or a public a HTTP website, as shown in FIGS. 8-10.

In example implementations, separate cookie jars are provided for secure windows and public windows, when the secure browsing mode is activated. Thus, a secure cookie jar is associated with the secure window, and a public cookie jar is associated with the public window.

At 107, a user may determine to enter an HTTPS URL in the secure mode browser. Thus, the secure cookie jar would be used. Further, the user attempts to request a public URL. For example, the URL may be an open HTTP site.

If it is determined that the user has requested a public URL while in the secure mode browser that uses the secure cookie jar, at 109, the connection is rejected for a two-window implementation, and the window is treated as a public window for the implicit implementation; the user may be notified. Optionally, as discussed below, the user may be provided with an override option (not illustrated).

If it is determined that the user has not requested a public URL, at 111, the URL requested by the user is accepted, and the secure connection is established, using the secure cookie jar, and the secure mode interface.

Figure 2:
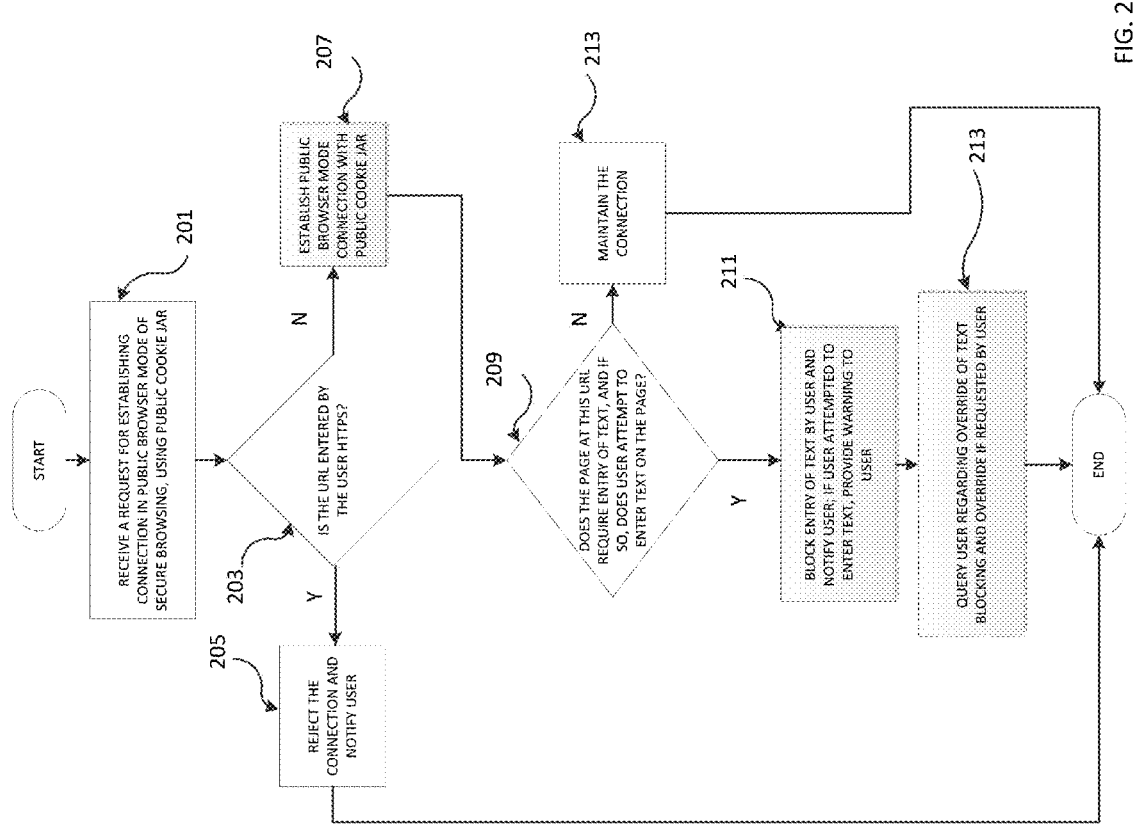
FIG. 2 illustrates a flowchart for establishing a connection in a public browser mode of secure browsing mode, in accordance with an example implementation.

Alternatively, the establishing unit may establish the connection through the public type window according to the flowchart of FIG. 2. FIG. 2 illustrates a flowchart for establishing a connection in a public window in accordance with an example implementation. In contrast with the secure window, the public window blocks HTTPS content, as well as entry of text, to prevent the user from inadvertently downloading secure content over a public connection. A warning may further be utilized to notify the user of the public connection while using the public window.

At 201, the establishing unit receives a request for establishing a connection in the public browser mode of secure browsing, using the public cookie jar. At 203, a URL that is entered by the user is judged to determine whether the URL entered by the user is secure, such as HTTPS. If it is determined that the URL that was entered by the user is a secure URL, then at 205, the connection is rejected, and the user is notified. Because the mode is public browser mode and the public cookie jar is being used, a secure connection is rejected.

On the other hand, if it is determined that the URL that was entered by the user is not secure, and is public, such as open HTTP, at 207, a public browser mode connection is established, with the public cookie jar. Accordingly, public browsing mode may be performed according to these mode and connection.

At 209, the determination is made as to whether the website being accessed by the user requires any entry of text, and if so, whether the user is attempting to enter text on the page. For example, text entry such as login, password, Account information, or other personal identifier information may be required by some websites. According to the example implementation, when in the public mode with the public cookie jar, and when a page at a URL is determined at 209 to require text entry, the user is blocked from entering the text and notified, as shown at 211; if the user is attempting to enter text, a further notification may be provided, as explained below with respect to the user interface implementations. Login attempts may be detected, for example, when the user is typing a username or password on the page at the URL. The prevention of login attempts can protect against phishing attempts in the public window, to avoid a user from being tricked into using a fake login page sent over HTTP. Both approaches of blocking destinations utilizing HTTPS content and blocking anything that appears to be a login attempt can be utilized in any order, and is not restricted to the flowchart depicted in FIG. 2.

On the other hand, if the URL does not require entry of text, then at 213, the maintained connection continues, and the user may continue to browse in public mode, in connection with the public cookie jar.

Optionally, as shown at 213, a user may be prompted or queried, due to the blocked entry of text by the user on a public URL. The prompt or queried may be related to providing the user with an option to override text blocking. This option is discussed further below in association with the example user interfaces.

For example, but not by way of limitation, the public window may utilize a warning dialog box with a click through requirement for the use, instead of blocking the login attempt or the outgoing connection. For example, a notice, such as "WARNING: Public browser session, DO NOT LOG IN HERE", can be displayed, along with a click through requirement before permitting further HTTPS connections in the public window, instead of rejecting the connection. The click through requirement can be implemented, for example, with a dialog box that gives the option to click on an icon or other indication to permit the connection, or on another icon or indication to prevent the connection. Alternatively, HTTPS connections may be allowed in the public window, while login attempts are prevented.

As explained above, if the outgoing connection is to a destination that utilizes any HTTPS content (e.g. a website with mixed HTTP and HTTPS content, clicking on a link within a cached webpage of a social networking session directed to another page within the social networking website, etc.), then the establishing unit denies the connection. Such a denial of connection is illustrated below in FIG. 3.

In accordance with an example implementation, the activation of the secure browser mode creates a separate, temporary cookie jar that is stored until the browser is closed for use with the public windows. The separate and temporary cookie jar can prevent users from providing personal information in a public site that is not a secure (e.g., HTTPs) site. For example, older tracking cookies, session cookies, etc., that may serve to identify the user may be placed in a different, secure cookie jar, and therefore do not get sent to public sites.

Figure 3:
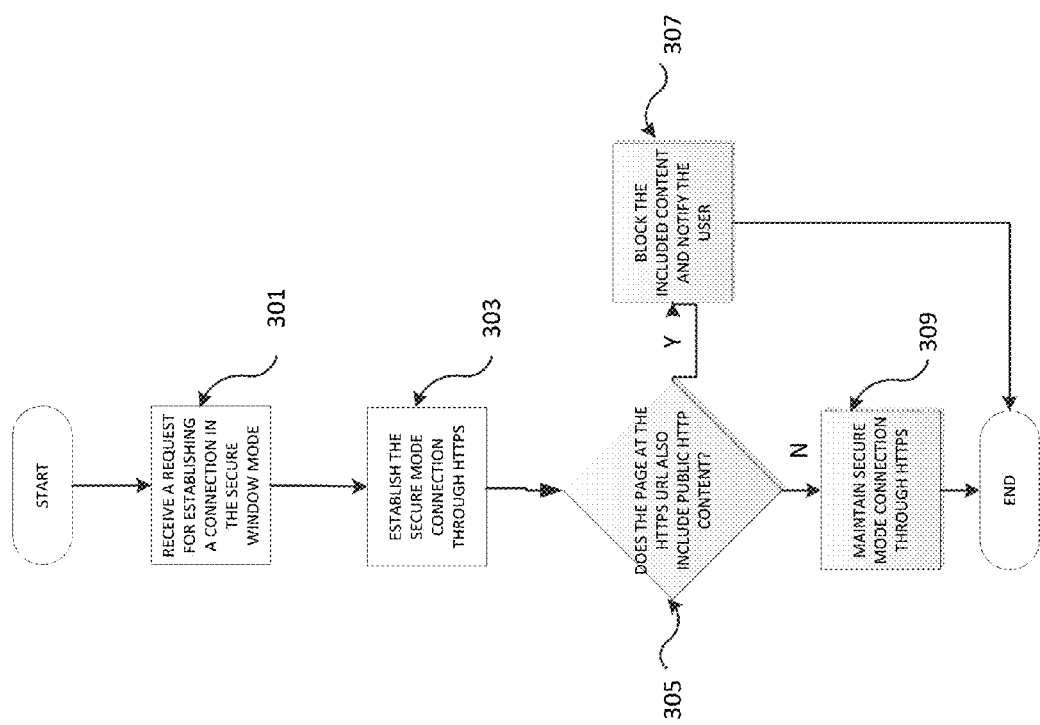
FIG. 3 illustrates a flowchart for establishing a connection in a secure window of secure browsing mode of secured window of secure browsing, in accordance with an example implementation.

FIG. 3 illustrates a flowchart for establishing a connection in a secure window in accordance with an example implementation. At 301, the establishing unit receives a request for establishing a connection through a secure window. At 303, the establishing unit forces the connection to be established through HTTPS. Uniform Resource Locators (URLs) submitted in the secure window may automatically require outgoing connections to use HTTPS. By only allowing HTTPS traffic, the secure window may therefore prevent the content of traffic between the user's web browser and the server in the HTTPS URL from being observed, even if the traffic is sent over an open access point, or after the traffic exits a VPN tunnel.

At 305, the establishing unit may further disallow mixed content (e.g. secure HTTPS and public HTTP content on a webpage), such that webpages utilizing HTTPS that also attempt to load HTTP content may have the HTTP content blocked by the establishing unit. More specifically, it is determined whether the page at the HTTPS connection also requires public content, such as HTTP content. If so, the content is deemed to be mixed, and the content is blocked and the user notified at 307. On the other hand, if the content is not deemed to be mixed but is only secure content, for which the secure cookie jar is used, then at 309, the secure connection is maintained through HTTPS.

Example User Interface

FIGS. 4-10 illustrate example user interfaces associated with operations of the foregoing example implementations. The user interfaces are illustrative only, and as would be understood by those skilled in the art, may be modified with departing from the scope of the example implementations.

As shown in FIG. 4, a user may open a browser, and open a list of options or browser settings. Once the browser settings are displayed, the user may select an option such as "Secure browsing". The selection may be made, for example, by focusing a cursor on the display option, using a keystroke such as CTRL+Z, or any other manner of selection as would be understood by those skilled in the art. According to another alternate example implementation, the browser itself may automatically detect, for example based on the identification of the wireless network, whether to engage the secure browsing mode, for a user that decides to select an option to have such automatic detection. According to another example implementation, a user may determine that certain networks are more trustworthy than other networks. Accordingly, the user may select to browse securely where network security is not trusted. Optionally, a browser may provide a suggestion to a user to turn on a secure browsing mode when certain criteria indicative of a network that is not trustworthy is determined to be true. Such a determination may be made based on factors and well-known in the art.

Figure 5:
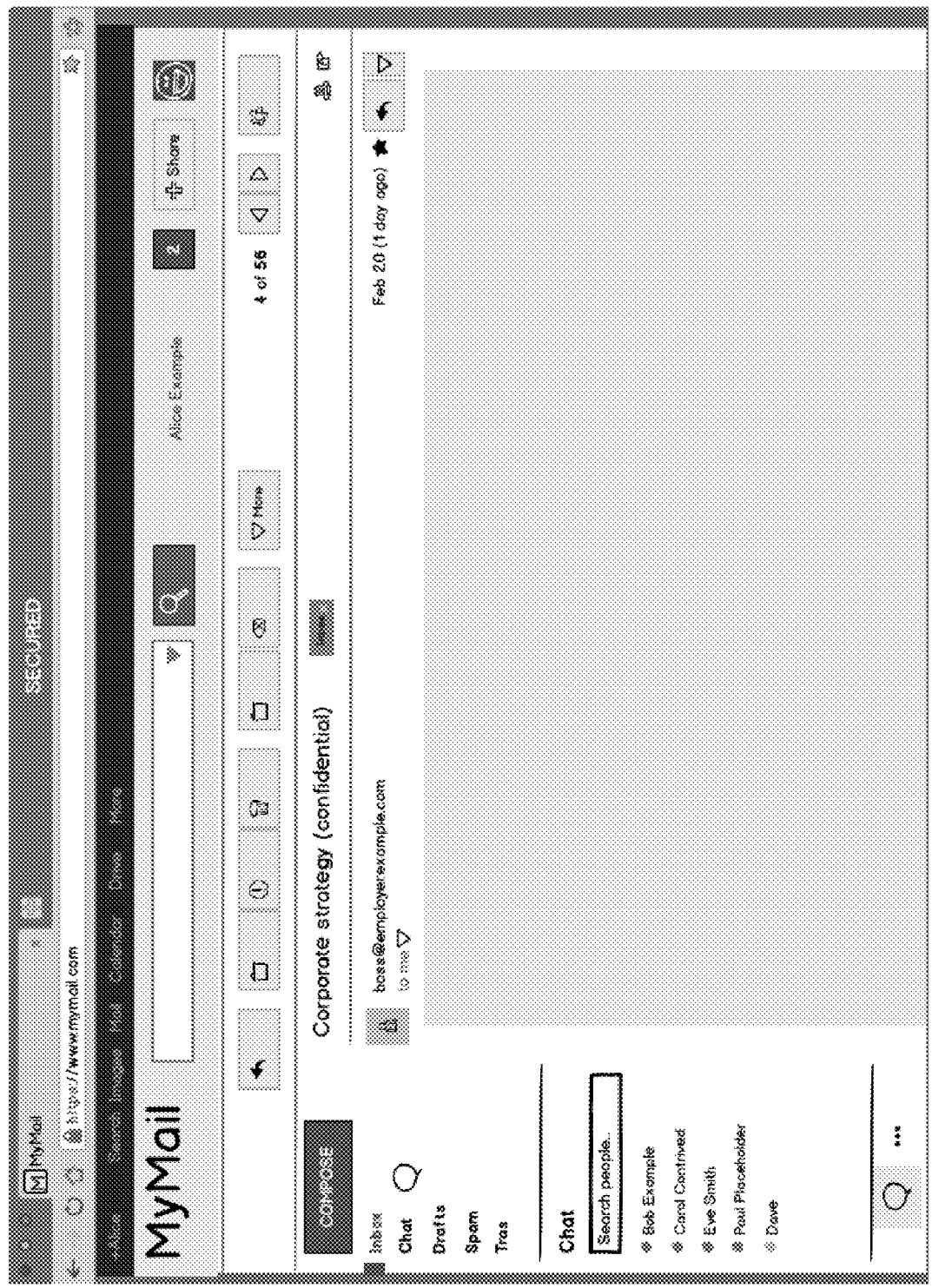
Figure 6:
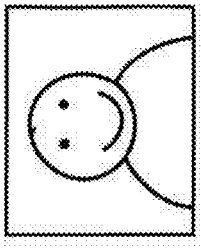

Once the "Secure browsing" mode has been selected, two new browser interfaces (e.g., windows) are opened. As shown in FIG. 5, one of the browser windows is marked "SECURED", and as shown in FIG. 6, the other of the browser windows is marked "PUBLIC". For example, FIG. 5 includes a site having a secure browsing mode requirement, such as an email account in an open session over HTTPs, and FIG. 6 includes a site not having a secure browsing mode requirement, such as a window browsing the news over ordinary HTTP.

Each of the two windows in FIG. 5 and FIG. 6 has a separate browser cookie jar. Further, only secure (e.g., HTTPs) sites are allowed in the secured mode windows, and text entry is not permitted in the public mode windows. HTTPS sites may not be permitted in the public mode windows, and vice versa.

Additionally, to the right of the URL entry field of the secure window in FIG. 5, the site is denoted as being bookmarked or on a "favorites" list. Because such a bookmarked list may be opened from the browser in HTTPs mode, a bookmark should automatically be loaded into the secured mode window shown in FIG. 5.

Figure 7:
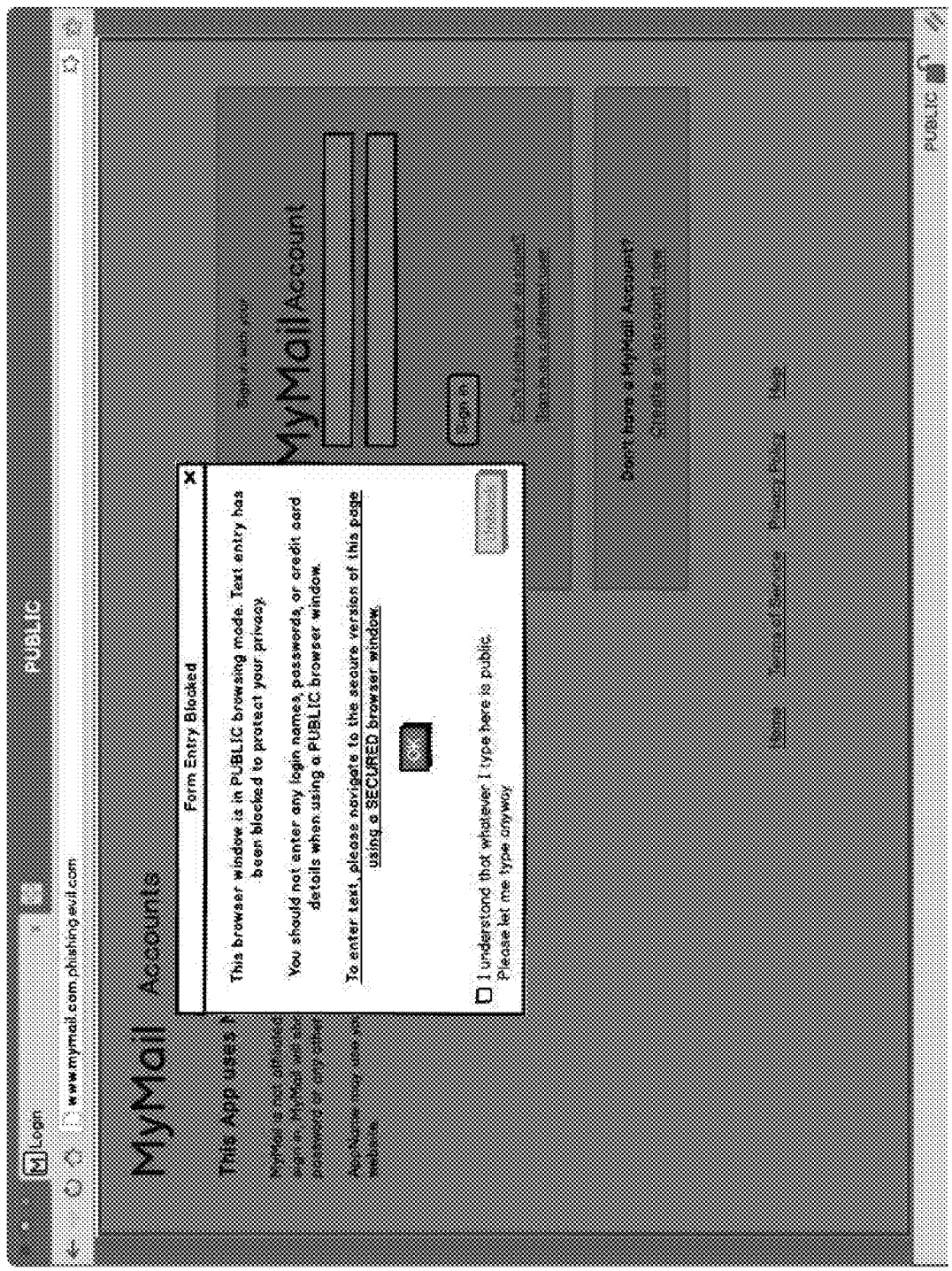

In the public mode, a user may access a malicious site that requests an input of credentials. For example, a user may be induced by to visit a phishing site from the public mode window. When the user is prompted for a login name and password, according to the example implementation, the user is blocked from entering such credentials. This blocking feature is shown in FIG. 7. For example, a popup window appears that informs the user that the browsing window is in public browsing mode, and that text entry has thus been blocked. The user is warned to not enter confidential information such as login information, passwords, credit card details, or the like. The user is also notified that text may be entered by navigating to a secure version of the page using the secured browser window (e.g., as shown in FIG. 5).

Optionally, as shown in FIG. 7, the user may be offered an override, whereby the user may check the checkbox in the bottom left corner of the popup window, which indicates that the user would enter text with the understanding that whatever is typed may be considered public. Thus, the risk is displayed, and the user selects the box to indicate understanding of the risk.

As another example implementation, the type of window (e.g., secured or public) is not marked, as in FIGS. 5 and 6. Instead, the window appears as an ordinary browser window, although separate cookie jars are provided for secured and public browsing. According to this example implementation, if an HTTPs link is opened, it is automatically in a "secured" window, although this status is not indicated to the user. If an HTTP link is opened, the browser is automatically in a "public" window, although the user does not receive an indication of this difference.

FIG. 8 illustrates an example interface of the establishment of secure browsing mode with Implicit Secure mode. As can be seen, there is no indication on the browser tab or frame itself that secure mode is enabled. Instead, and information pop up box provides this information. A "Note" is also provided that the secure browsing cannot work with websites that do not offer secure access, or if secure access connections attempts are blocked by a firewall.

If a user attempts to type text into a plain HTTP page, a "Form Entry Blocked" warning such as a popup window will be displayed, as shown in FIG. 9. Similar to FIG. 7, an override selection may be optionally provided to the user. The user is provided with an indication that the website is not secure, as well as information about the risks of text entry on the website. The user is recommended to visit a secure version of the site (e.g., HTTPs).

In each of the foregoing example implementations, mixed content (e.g., plain HTTP content loaded from within an HTTPs secured page is not permitted in HTTPs secure windows, and such content would be blocked from loading into the browser.

According to another example implementation, the determination of whether a window is secure or public is implicitly determined, based on whether a secure page (e.g., HTTPs) is being viewed. Thus, as explained above, the user cannot visibly determine whether the window is a secure window as shown in FIG. 5 or a public window as shown in FIG. 6, by labeling of the browser. Some websites may use secure login pages and then set session cookies to maintain a user's logged-in status when on a public page. Such a website would be blocked according to this example implementation, because, unlike related art browsers, a browser with a "secure browsing" feature would not share the cookie jar across secure and public pages from the same domain. Thus, it would not be possible for the site to be shown on a browser as being logged in when public content is being viewed. Optionally, information may be provided to a user explaining why they may not appear to be logged in on public websites, although they may believe that they are logged in, due the initial login page having been secure.

For example, as shown in FIG. 10, the browser is in the secure mode, because the user activated the secure browsing mode. If a user attempts to enter text in order to access a public page that is not HTTPs, the user is provided with a display, in this illustration on a horizontal bar below the URL, indicating that the text entry was blocked because the site is not SSL secure. The user is provided with the option of continuing to block input, or not continuing to block input (e.g., allow text entry on a public HTTP side that is not a secure HTTPs site).

Example Computing Device and Environment

Figure 11:
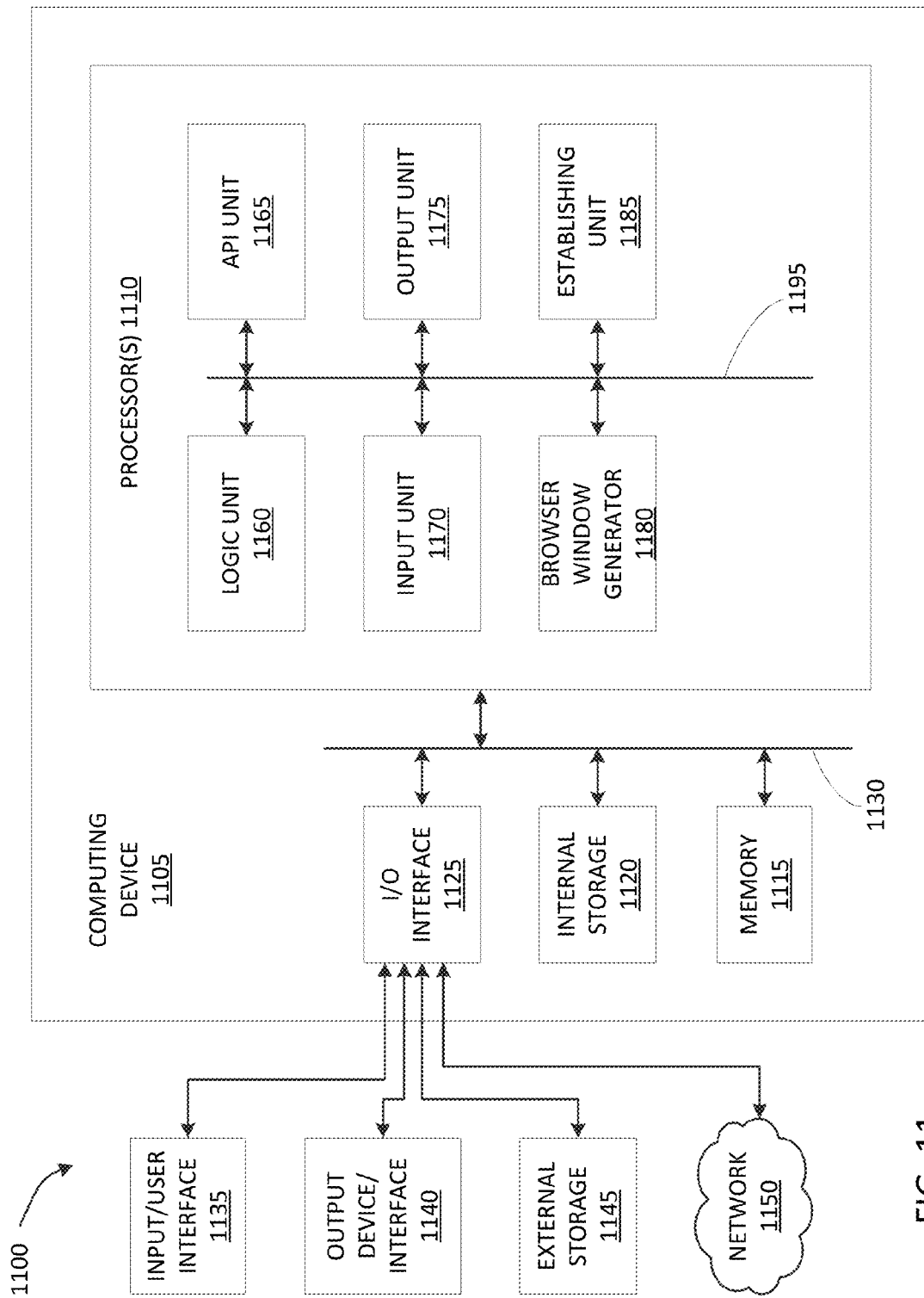
FIG. 11 illustrates an example computing environment with an example computing device suitable for implementing at least one example implementation.

FIG. 11 shows an example computing environment with an example computing device suitable for implementing at least one example implementation. Computing device 1105 in computing environment 1100 can include one or more processing units, cores, or processors 1110, memory 1115 (e.g., RAM or ROM), internal storage 1120 (e.g., magnetic, optical, or solid state storage), and I/O interface 1125, all of which can be coupled on a communication mechanism or bus 1130 for communicating information.

Computing device 1105 can be communicatively coupled to input/user interface 1135 and output device/interface 1140, which can be detachable. Input/user interface 1135 includes any device, component, or interface, physical or virtual, that can be used to provide input (e.g., keyboard, a pointing/cursor control, microphone, camera, braille, or the like). Output device/interface 1140 includes a display, monitor, printer, speaker, braille, or the like. In some example implementations, input/user interface 1135 and output device/interface 1140 can be embedded with or physically coupled to computing device 1105 (e.g., a mobile computing device with buttons or touch-screen input/user interface and an output or printing display).

Computing device 1105 can be communicatively coupled to external storage 1145 and network 1150 for communicating with any number of networked components, devices, and systems, including one or more computing devices of same or different configuration. Computing device 1105 or any connected computing device can be functioning as, providing services of, or referred to as a server, client, thin server, general machine, special-purpose machine, or by other label.

I/O interface 1125 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1100. Network 1150 can be any network or combination of networks (e.g., the Internet, local area network, wide area network, a telephonic network, a cellular network, satellite network, and the like).

Computing device 1105 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1105 can be used to implement techniques, methods, applications, processes, or computer-executable instructions to implement at least one implementation (e.g., a described implementation). Computer-executable instructions can be retrieved from transitory media, and stored on and retrieved from non-transitory media. The executable instructions can be originated from one or more of any programming, scripting, and machine languages (e.g., C, C++, C#, Java, Visual Basic, Python, Perl, JavaScript, and others).

Processor(s) 1110 can execute under any operating system (OS) (not shown), in a native or virtual environment. To implement a described implementation, one or more applications can be deployed that include logic unit 1160, application programming interface (API) unit 1165, input unit 1170, output unit 1175, browser window generator 1180, establishing unit 1185, and inter-unit communication mechanism 1195 for the different units to communicate with each other, with the OS, and with other applications (not shown). For example, browser window generator 1180 and establishing unit 1185 may implement the process sequence of FIG. 1. The described units and elements can be varied in design, function, configuration, or implementation and are not limited to the descriptions provided.

In some example implementations, when information or an execution instruction is received by API unit 1165, it may be communicated to one or more other units (e.g., logic unit 1160, input unit 1170, output unit 1175, browser window generator 1180, and establishing unit 1185). For example, after input unit 1170 has detected a user indication or feedback, input unit 1170 may use API unit 1165 to communicate the user indication to browser window generator 1180. Browser window generator 1180 may, via API unit 1165, interact with the establishing unit 1185 to detect and process an outgoing connection.

In some examples, logic unit 1160 may be configured to control the information flow among the units and direct the services provided by API unit 1165, input unit 1170, output unit 1175, settings management unit 1180, settings mapping unit 1185, and privacy management unit 1190 in order to implement an implementation described above. For example, the flow of one or more processes or implementations may be controlled by logic unit 1160 alone or in conjunction with API unit 1165.

Although a few example implementations have been shown and described, these example implementations are provided to convey the subject matter described herein to people who are familiar with this field, but it should be understood that the subject matter described herein may be implemented in various forms without being limited to the example implementations set forth herein. Example implementations can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
    establishing a type of a browser mode based on a text content of a uniform resource locator (URL) of a browser window;
    wherein when the type of the browser mode is a secure browser mode based on the text content of the URL being of a Hypertext Transfer Protocol Secure (HTTPS) connection type, establishing a secure type of the browser window configured to manage the HTTPS connection through the browser window and reject a Hypertext Transfer Protocol (HTTP) connection, and
    establishing a public type of the browser window configured to manage a HTTP connection and reject a HTTPS connection based on the text content of the URL being of an HTTP type, the public type of browser window further configured to block HTTPS content of a web page loaded into the public type of the browser window,
    wherein managing the HTTPS connection and rejecting the HTTP connection based on the text content of the URL being of the HTTPS type comprises blocking an attempted HTTP connection prior to establishment of the HTTP connection while the HTTPS connection is established to prevent establishing the HTTP connection, and
    wherein managing the HTTP connection and rejecting the HTTPS connection based on the text content of the URL being of the HTTP type comprises blocking an attempted HTTPS connection prior to establishment of the HTTPS connection while the HTTP connection is established to prevent establishing the HTTPS connection, such that the HTTPS connection and the HTTP connection run non-concurrently with respect to one another.

2. The computer-implemented method of claim 1, further comprising:
    generating, for the public type of the browser window, a temporary cookie jar; and,
    removing the temporary cookie jar when the public type of the browser window is closed.

3. The computer-implemented method of claim 1, further comprising:
    generating, for the public type of the browser window, a public cookie jar;
    generating, for the secure type of the browser window, a secure cookie jar and,
    removing the secure cookie jar when the type of the browser window is not secure, and removing the public cookie jar when the type of the browser window is secure.

4. The computer-implemented method of claim 1, further comprising:
    when the type of the browser window is the public type, preventing any one of at least one connection that requires a login within the browser window.

5. The computer-implemented method of claim 4, wherein the rejecting the at least one connection that requires the login further comprises:
    disabling text input to at least one form field of the browser window;
    providing a warning, and
    permitting the text input upon receipt of a click through of the warning.

6. The computer-implemented method of claim 1, further comprising:
    detecting a type of a wireless connection used to establish the at least one connection through the browser window; and
    recommending the type of browser mode to be the secure browser mode when the type of the wireless connection is an open wireless connection.

7. The computer-implemented method of claim 1, wherein the rejecting the HTTPS connection further comprises providing a warning, and permitting the HTTPS connection upon receipt of a click through of the warning.

8. A non-transitory computer readable medium having stored therein a program for making a computer execute a method for establishing a connection, the program including computer executable instructions for performing steps comprising:
    establishing a type of a browser mode based on a text content of a uniform resource locator (URL) of a browser window,
        wherein the type of the browser mode is a public browser mode based on the text content of the URL being of a Hypertext Transfer Protocol (HTTP) connection type, and
        wherein the type of the browser mode is a secure browser mode based on the text content of the URL being of a Hypertext Transfer Protocol Secure (HTTPS) connection type,
    establishing the secure type of the browser window configured to manage the HTTPS connection through the browser window and reject a HTTP connection, and establishing the public type of the browser window configured to manage the HTTP connection and reject a HTTPS connection based on the text content of the URL being of an HTTP type, the public type of browser window further configured to block HTTPS content of a web page loaded into the public type of the browser window, wherein managing the HTTPS connection and rejecting the HTTP connection based on the text content of the URL being of the HTTPS type comprises blocking an attempted HTTP connection prior to establishment of the HTTP connection while the HTTPS connection is established to prevent establishing the HTTP connection, and wherein managing the HTTP connection and rejecting the HTTPS connection based on the text content of the URL being of the HTTP type comprises blocking an attempted HTTPS connection prior to establishment of the HTTPS connection while the HTTP connection is established to prevent establishing the HTTPS connection, such that the HTTPS connection and the HTTP connection do not non-concurrently with respect to one another.

9. The non-transitory computer readable medium of claim 8, further comprising computer executable instructions for performing steps comprising:
generating, for the public type of the browser window, a temporary cookie jar; and,
removing the temporary cookie jar when the public type of the browser window is closed.

10. The non-transitory computer readable medium of claim 8, further comprising:
generating, for the public type of the browser window, a public cookie jar;
generating, for the secure type of the browser window, a secure cookie jar and,
removing the secure cookie jar when the type of the browser window is not secure, and removing the public cookie jar when the type of the browser window is secure.

11. The non-transitory computer readable medium of claim 8, further comprising computer executable instructions for performing steps comprising:
when the type of the browser window is the public type, preventing any one of at least one connection that requires a login within the browser window.

12. The non-transitory computer readable medium of claim 8, further comprising computer executable instructions for performing steps comprising:
disabling text input to at least one form field of the browser window;
providing a warning, and
permitting the text input upon receipt of a click through of the warning.

13. The non-transitory computer readable medium of claim 8, further comprising computer executable instructions for performing steps comprising:
detecting a type of a wireless connection used to establish the at least one connection through the browser window; and
recommending the type of browser mode to be the secure browser mode when the type of the wireless connection is an open wireless connection.

14. The non-transitory computer readable medium of claim 8, wherein the rejecting the HTTPS connection further comprises providing a warning, and permitting the HTTPS connection upon receipt of a click through of the warning.

15. An apparatus comprising a microprocessor, the microprocessor of the apparatus configured to perform functions of:
a browser window generator that is executed on a microprocessor to generate a type of a browser window based on a text content of a uniform resource locator (URL) of a browser window; and
an establishing unit, executed by the microprocessor, that,
in response to the text content of the URL being of a Hypertext Transfer Protocol Secure (HTTPS) connection type, the type of the browser window is secure, and establishes at least one connection through the browser window as the HTTPS connection and rejects a Hypertext Transfer Protocol (HTTP) connection, and
in response to the text content of the URL being of a HTTP connection type, the type of the browser window is public, and rejecting any one of the at least one connection that is the HTTPS connection and establishing any one of the at least one connection that is the HTTP connection based on the text content of the URL being of an HTTP type, the public type of browser window further configured to block HTTPS content of a web page loaded into the public type of the browser window,
wherein managing the HTTPS connection and rejecting the HTTP connection based on the text content of the URL being of the HTTPS type comprises blocking an attempted HTTP connection prior to establishment of the HTTP connection while the HTTPS connection is established to prevent establishing the HTTP connection, and
wherein managing the HTTP connection and rejecting the HTTPS connection based on the text content of the URL being of the HTTP type comprises blocking an attempted HTTPS connection prior to establishment of the HTTPS connection while the HTTP connection is established to prevent establishing the HTTPS connection and such that the HTTPS connection and the HTTP connection run non-concurrently with respect to one another.

16. The apparatus of claim 15, wherein the establishing unit generates, for the public type of the browser window, a temporary cookie jar; and that removes the temporary cookie jar when the public type of the browser window is closed.

17. The apparatus of claim 15, further comprising:
generating, for the public type of the browser window, a public cookie jar;
generating, for the secure type of the browser window, a secure cookie jar and,
removing the secure cookie jar when the type of the browser window is not secure, and removing the public cookie jar when the type of the browser window is secure.

18. The apparatus of claim 15, wherein, when the type of the browser window is the public type, the establishing unit rejects any one of the at least one connection that requires a login.

19. The apparatus of claim 15, wherein the establishing unit rejects the at least one connection that requires the login by disabling text input to at least one form field of the browser window; providing a warning, and permitting the text input upon receipt of a click through of the warning.

20. The apparatus of claim 15, wherein the establishing unit detects a type of a wireless connection used to establish the at least one connection through the browser window; and recommends a secure type browsing mode when the type of the wireless connection is an open wireless connection.

21. The apparatus of claim 15, wherein the establishing unit rejects the HTTPS connection further comprises providing a warning, and permits the HTTPS connection upon receipt of a click through of the warning.

* * * * *